US008854677B2

(12) United States Patent
Oguma

(10) Patent No.: US 8,854,677 B2
(45) Date of Patent: Oct. 7, 2014

(54) PUSH-NOTIFICATION SYSTEM AND METHOD FOR NOTIFYING EVENT MESSAGE TO MOBILE TERMINAL APPARATUS

(71) Applicant: KYOCERA Document Solutions Inc., Osaka (JP)

(72) Inventor: Takashi Oguma, Osaka (JP)

(73) Assignee: KYOCERA Document Solutions inc. (JP)

( * ) Notice: Subject to any disclaimer, the term of this patent is extended or adjusted under 35 U.S.C. 154(b) by 0 days.

(21) Appl. No.: 13/952,555

(22) Filed: Jul. 26, 2013

(65) Prior Publication Data
US 2014/0036309 A1  Feb. 6, 2014

(30) Foreign Application Priority Data

Jul. 31, 2012  (JP) ................................ 2012-170450

(51) Int. Cl.
G06F 3/12  (2006.01)
(52) U.S. Cl.
CPC ........................................ G06F 3/12 (2013.01)
USPC ......................................... 358/1.15; 709/203
(58) Field of Classification Search
USPC ................................................ 358/1.1–1.16
See application file for complete search history.

(56) References Cited

U.S. PATENT DOCUMENTS

| 2002/0101604 | A1* | 8/2002 | Mima et al. | 358/1.15 |
| 2006/0111090 | A1* | 5/2006 | Lapstun et al. | 455/414.1 |
| 2007/0024895 | A1* | 2/2007 | Clark | 358/1.15 |
| 2008/0209419 | A1* | 8/2008 | Maeda | 718/100 |
| 2008/0228915 | A1 | 9/2008 | Tamura | |

FOREIGN PATENT DOCUMENTS

JP  2008-233994  10/2008

* cited by examiner

*Primary Examiner* — Benny Q Tieu
*Assistant Examiner* — Michael Y Tzeng
(74) *Attorney, Agent, or Firm* — McDonnell Boehnen Hulbert & Berghoff LLP

(57) ABSTRACT

A push notification system includes an image forming apparatus, a mobile terminal apparatus, a push notification server, and a provider that are connected to a network. The image forming apparatus prints print job data transmitted from the mobile terminal apparatus, generates a first event message including a status code, its attribute information, and a device token of the mobile terminal apparatus in the print job data, and transmits it to the provider. The provider generates a second event message including the device token in a record, registered in a subscription table and matching a status type code of the status code in the first event message and the device token, and the status code in the first event message, and transmits it to the push notification server. The push notification server transmits the second event message to the mobile terminal apparatus of the device token in the second event message.

20 Claims, 11 Drawing Sheets

FIRST SUBSCRIPTION TABLE 621

| SUBSCRIPTION ID | STATUS TYPE CODE | IP ADDRESS | DEADLINE |
|---|---|---|---|
| 1 | 01 | 192.168.2.12 | 20120717:134709 |
| 2 | 02 | 192.168.2.12 | 20120717:134709 |
| 3 | 01 | 192.168.2.15 | 20120719:102512 |
| 4 | * | 128.532.6.02 | 20120820:090201 |
| ⋮ | ⋮ | ⋮ | ⋮ |

Fig. 4A

STATUS TYPE TABLE

| STATUS TYPE CODE | NAME |
|---|---|
| * | ALL STATUSES |
| 01 | CHANGE OF PRINT JOB STATUS |
| 02 | TONER REMAINING AMOUNT |
| 03 | REMAINING SHEETS IN PAPER FEED CASSETTE |
| ⋮ | ⋮ |

Fig. 4B

STATUS TABLE

| STATUS CODE | NAME |
|---|---|
| 0100 | WATING FOR PRINTING |
| 0101 | DURING PRINTING |
| 0102 | STOPPING PRINTING |
| 0103 | THE NUMBER OF PRINTED SHEETS |
| 0104 | COMPLETION OF PRINTING |
| 0200 | CYAN TONER REMAINING AMOUNT |
| 0201 | MAGENTA TONER REMAINING AMOUNT |
| 0202 | YELLOW TONER REMAINING AMOUNT |
| 0203 | BLACK TONER REMAINING AMOUNT |
| 0304 | REMAINING SHEETS IN PAPER FEED CASSETTE 1 |
| 0305 | REMAINING SHEETS IN PAPER FEED CASSETTE 2 |
| ⋮ | ⋮ |

Fig. 4C

SECOND SUBSCRIPTION TABLE  83

| STATUS TYPE CODE | DEVICE TOKEN | DEADLINE |
|---|---|---|
| 01 | devToken001 | 20120820:141228 |
| 02 | devToken001 | 20120820:141228 |
| 02 | devToken002 | 20120825:134709 |
| ⋮ | ⋮ | ⋮ |

Fig. 8

JOB STATUS TABLE

| JOB ID | STATUS CODE | THE NUMBER OF PRINTED SHEETS |
|---|---|---|
| GUID01 | 0102 | 5/20 |
| GUID02 | 0101 | 19/22 |
| ⋮ | ⋮ | ⋮ |

Fig. 10A

DOCUMENT NAME TABLE

| JOB ID | DOCUMENT NAME |
|---|---|
| GUID01 | doc1.doc |
| GUID02 | doc2.doc |
| ⋮ | ⋮ |

Fig. 10B

PUSH-NOTIFICATION SYSTEM AND METHOD FOR NOTIFYING EVENT MESSAGE TO MOBILE TERMINAL APPARATUS

INCORPORATION BY REFERENCE

This application is based upon, and claims the benefit of priority from, corresponding Japanese Patent Application No. 2012-170450, filed in the Japan Patent Office on Jul. 31, 2012, the entire contents of which are incorporated herein by reference.

FIELD

Unless otherwise indicated herein, the description in this background section is not prior art to the claims in this application and is not admitted to be prior art by inclusion in this section. The present disclosure relates to a push notification system and a push notification method in which a provider converts an event message received directly or via a print server from an image forming apparatus and transmits it to a push notification server, and the push notification server provides a push notification containing the event message to a mobile terminal apparatus.

BACKGROUND

WS-Eventing refers to notifying an event occurring in a network apparatus (such as an image forming apparatus) to a host (such as a client apparatus) via a network. According to established WS-Eventing specifications, an event of a specific type is notified only to the host that has requested to be registered for notification of event messages. No special management device is needed for notification of the event messages to the host.

The WS-Eventing specifications are not applicable to some mobile terminal apparatuses such as an iPhone® smartphone. Thus a mechanism for providing a push notification containing the event message from a provider via Apple push notification service (APNS) to an iPhone® is used instead.

However, in order to provide a push notification containing the event occurring in the image forming apparatus to the iPhone® as the host employing the mechanism of making push notification via the APNS, incorporating the provider in the image forming apparatus complicates the software configuration of the image forming apparatus. In addition, the incorporation of the provider prevents existing image forming apparatuses from being used.

SUMMARY

The present disclosure relates to a push notification system and a push notification method for providing a push notification to a mobile terminal apparatus that requires a push notification specification different from that of WS-Eventing.

A push notification system according to an embodiment of the present disclosure includes an image forming apparatus connected to a network, a mobile terminal apparatus connected to the network via an access point connected to the network, a push notification server connected to the network, and a provider connected to the network.

The mobile terminal apparatus is configured to transmit print job data to the image forming apparatus, and cause the image forming apparatus to print the print job data.

The image forming apparatus is configured to generate a first event message that includes a status code, attribute information corresponding to the status code, and, if a status type code to which the status code belongs indicates a print job status, a device token of the mobile terminal apparatus included in the print job data, and transmit the first event message to the provider.

The provider is configured to, in response to a subscription registration request including the status type code and the device token transmitted from the mobile terminal apparatus, register a record that includes the status type code and the device token in a subscription table.

The provider is further configured to, if the first event message transmitted from the image forming apparatus includes no device token, generate a second event message that includes the device token in a first record and the status code and the attribute information included in the first event message, the first record being registered in the subscription table and matching the status type code to which the status code included in the first event message belongs.

The provider is further configured to, if the first event message transmitted from the image forming apparatus includes the device token, generate the second event message that includes the device token in a second record and the status code and the attribute information included in the first event message. The second record is registered in the subscription table and matches the status type code to which the status code included in the first event message belongs and the device token is included in the first event message.

The provider is further configured to transmit the second event message to the push notification server.

The push notification server is configured to transmit the second event message to the mobile terminal apparatus corresponding to the device token included in the second event message.

A push notification method according to an embodiment of the present disclosure is performed by an image forming apparatus connected to a network, a mobile terminal apparatus connected to the network via an access point connected to the network, a push notification server connected to the network, and a provider connected to the network.

The mobile terminal apparatus is configured to transmit print job data to the image forming apparatus, and cause the image forming apparatus to print the print job data.

The image forming apparatus generates a first event message that includes a status code, attribute information corresponding to the status code, and, if a status type code to which the status code belongs indicates a print job status, a device token of the mobile terminal apparatus included in the print job data. The image forming apparatus also transmits the first event message to the provider.

The provider, in response to a subscription registration request including a status type code and a device token transmitted from the mobile terminal apparatus, registers a record that includes the status type code and the device token in a subscription table. If the first event message transmitted from the image forming apparatus includes no device token, the provider generates a second event message that includes a device token in a record and the status code and the attribute information included in the first event message, the record being registered in the subscription table and matching the status type code to which the status code included in the first event message belongs. If the first event message transmitted from the image forming apparatus includes the device token, the provider generates the second event message that includes a device token in a record and the status code and the attribute information included in the first event message, the record being registered in the subscription table and matching the status type code to which the status code included in the first event message belongs and the device token included in the first event message. The provider also transmits the second event message to the push notification server.

The push notification server transmits the second event message to the mobile terminal apparatus corresponding to the device token included in the second event message.

Additional features and advantages are described herein, and will be apparent from the following Detailed Description and the figures.

BRIEF DESCRIPTION OF THE FIGURES

In the accompanying drawings:

FIG. 4A is a tabular diagram illustrating an example of a first subscription table;

FIG. 4B is a tabular diagram illustrating an example of a status type table;

FIG. 4C is a tabular diagram illustrating an example of a status table;

FIG. 8 is a tabular diagram illustrating an example of a second subscription table;

FIG. 10A is a tabular diagram illustrating an example of a job status table in a status storage unit in the provider;

FIG. 10B is a tabular diagram illustrating an example of a document name table of correspondence between job IDs and document names;

DETAILED DESCRIPTION

Figure 1:
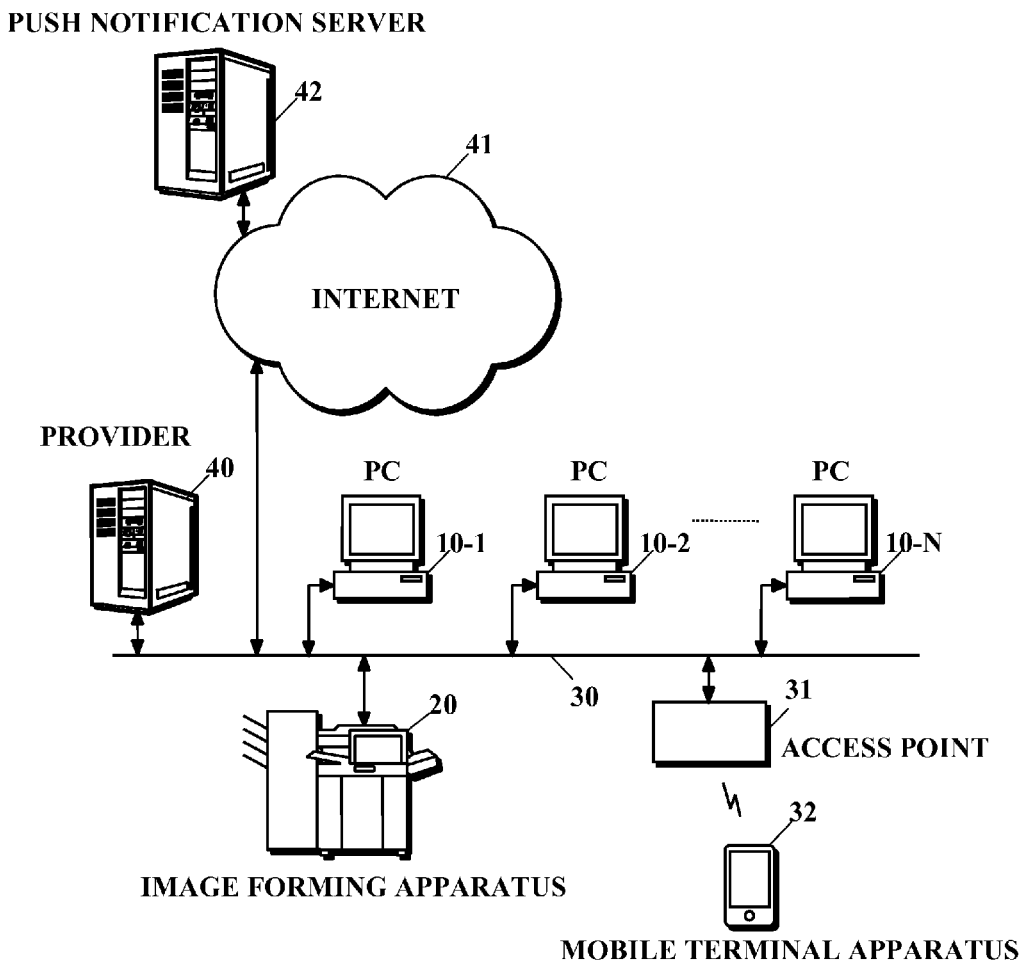
FIG. 1 is a schematic diagram illustrating a push notification system according to an embodiment of the present disclosure.

FIG. 1 is a schematic diagram illustrating a configuration of a push notification system according to an embodiment of the present disclosure.

In the push notification system, N personal computers (PCs) 10-1 to 10-N and an image forming apparatus 20 are connected via a local area network (LAN) 30. Subscription registration is made in accordance with WS-Eventing, a print target file and the image forming apparatus 20 are specified from any of the PCs 10-1 to 10-N, the content of this file is printed by the image forming apparatus 20, and, if a change occurs in the status relating to the image forming apparatus 20 (including a print job status), a push notification with an event message corresponding to the change is provided to a status monitor of a PC that has been registered for subscription in accordance with WS-Eventing. This enables the status of the image forming apparatus 20 to be identified on the screen of the status monitor.

The LAN 30 is further connected to a mobile terminal apparatus 32 via an access point 31. The mobile terminal apparatus 32 can transmit a print job to the image forming apparatus 20 and cause the image forming apparatus 20 to print the print job. To provide a push notification to the mobile terminal apparatus 32 of the change in the status of the image forming apparatus 20, the LAN 30 is connected to a provider 40. In response to a request to make push notification from the image forming apparatus 20 to a push notification server 42 via the Internet 41, the push notification server 42 provides a push notification containing the event message to the status monitor of the mobile terminal apparatus 32.

In the following description about embodiments, the mobile terminal apparatus 32 may be an iPhone®, and the push notification server 42 may be an APNS. The present disclosure is not limited to this configuration.

Figure 2:
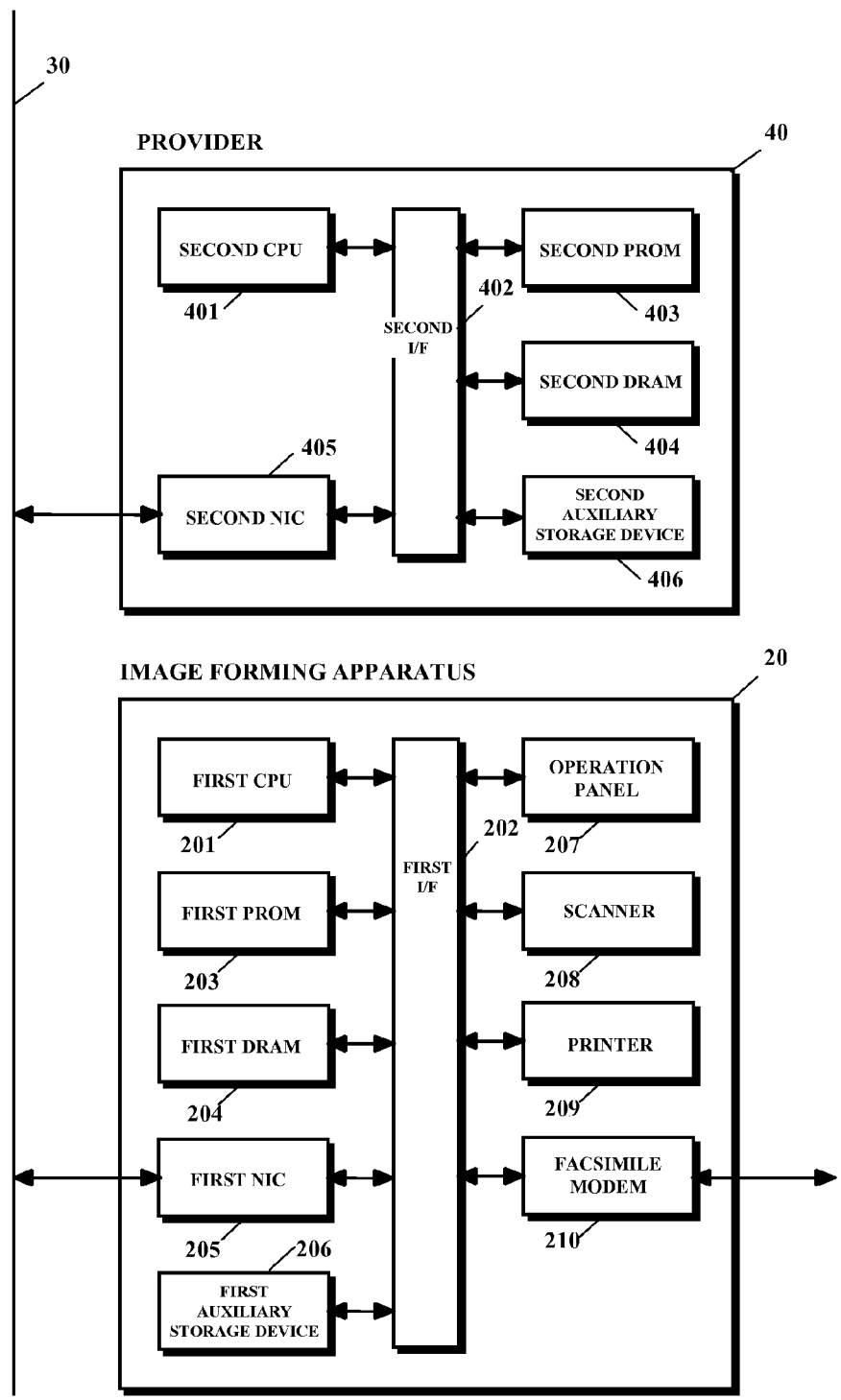
FIG. 2 is a block diagram illustrating hardware configurations of a provider and an image forming apparatus in the push notification system.

FIG. 2 is a block diagram illustrating hardware configurations of the provider 40 and the image forming apparatus 20 in the push notification system.

In the image forming apparatus 20, a first central processing unit (CPU) 201 is connected to a first programmable read-only memory (PROM) 203, a first dynamic random access memory (DRAM) 204, a first network interface card (NIC) 205, a first auxiliary storage device 206, an operation panel 207, a scanner 208, a printer 209, and a facsimile modem 210 via a first interface 202. In FIG. 2, several different kinds of interfaces are represented as a single block 202.

The first PROM 203 stores a basic input output system (BIOS), an operating system (OS), various drivers, and various applications for use in functioning as the image forming apparatus. The applications include a configuration relating to push notification in the image forming apparatus 20 illustrated in FIG. 3. The first DRAM 204 is used as a main memory. The first auxiliary storage 206 can store data for printing, image data read by the scanner 208, an auxiliary file described later, and data received by the facsimile. The first NIC 205 is connected to the LAN 30. The operation panel 207 includes an input unit and a display unit. The scanner 208 generates an image file. This file is used for printing, transmission by the facsimile, or file transmission. The printer 209 includes a print engine, a paper feed unit, a paper transport unit, and a paper output unit.

In the provider 40, a second CPU 401 is connected to a second PROM 403, a second DRAM 404, a second NIC 405, and a second auxiliary storage 406 via the second interface 402. In FIG. 2, several different kinds of interfaces are represented as a single block 402.

An example of the second PROM 403 can be a flash memory. The second PROM 403 stores the BIOS. The second DRAM 404 is used as the main memory. The second NIC 405 is connected to the LAN 30. The second auxiliary storage 406 stores the OS, various drivers, applications, and data. The applications include a configuration relating to push notification in the provider 40 illustrated in FIG. 3.

Figure 3:
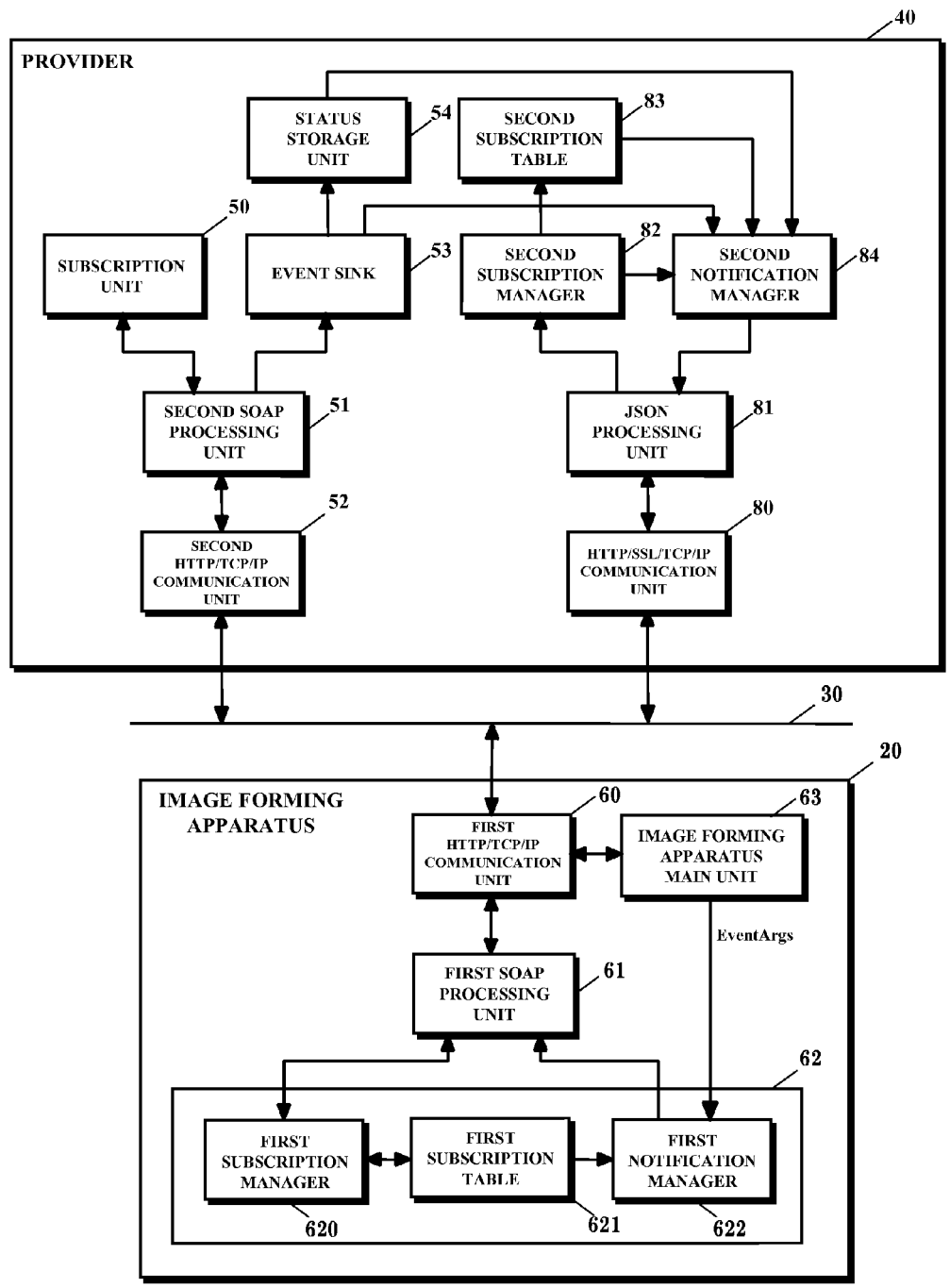
FIG. 3 is a block diagram illustrating functional configurations of the provider and the image forming apparatus in the push notification system.

FIG. 3 is a block diagram illustrating functional configurations of the provider 40 and the image forming apparatus 20 in the push notification system.

In the provider 40, a subscription unit 50 is activated at the time of the start-up of the OS, that is, when the OS is up and the subscription unit 50 becomes operable, or by an input of an instruction, for example, an operation of an administrator. Then the subscription unit 50 Extensible Markup Language (XML)-serializes predetermined subscription registration request information to form a Simple Object Access Protocol (SOAP) request message via a second SOAP processing unit 51 and transmits it to the image forming apparatus 20 via an HTTP/TCP/IP protocol stack in a second HTTP/TCP/IP communication unit 52 and the LAN 30. The SOAP request message is supplied to a first SOAP processing unit 61 via the HTTP/TCP/IP protocol stack in a first HTTP/TCP/IP communication unit 60 in the image forming apparatus 20, the SOAP request message is XML-deserialized, and it is provided as a subscription registration request object to a first subscription manager 620 in an event source 62. The first subscription manager 620 registers for subscription in a first subscription table 621 on the basis of the subscription registration request object.

The SOAP request message includes a ReplyTo address (address of the subscription unit 50), a NotifyTo address (address of an event sink 53), a To address including an IP address of a request destination (address of the first subscription manager 620), and a status type code as a filter element. The status type code included in the SOAP request message is included in the subscription registration request information and indicates all statuses.

FIG. 4A is a tabular diagram illustrating an example of the first subscription table 621 included in the image forming apparatus 20. The first subscription manager 620 generates a unique subscription ID, and registers for subscription by adding a record that includes the subscription ID, the status type code and the IP address of NotifyTo included in the subscription registration request object, and a deadline in which a predetermined value is added to the present time (deadline until which notification is valid) to the first subscription table 621.

FIGS. 4B and 4C are tabular diagrams illustrating a status type table and a status table, respectively. The status code may have four digits in which the first two digits are a status type code. The status type of the status codes 0100 to 0104 in FIG. 4C indicates a job status in FIG. 4B. Similarly, the status type of the status codes 0200 to 0203 indicates a toner remaining amount. All the above-described statuses are indicated by "*."

When an event occurs in an image forming apparatus main unit 63, a first notification manager 622 is called together with its argument (EventArgs). The first notification manager 622 searches the first subscription table 621 and performs a notification process.

Figure 5:
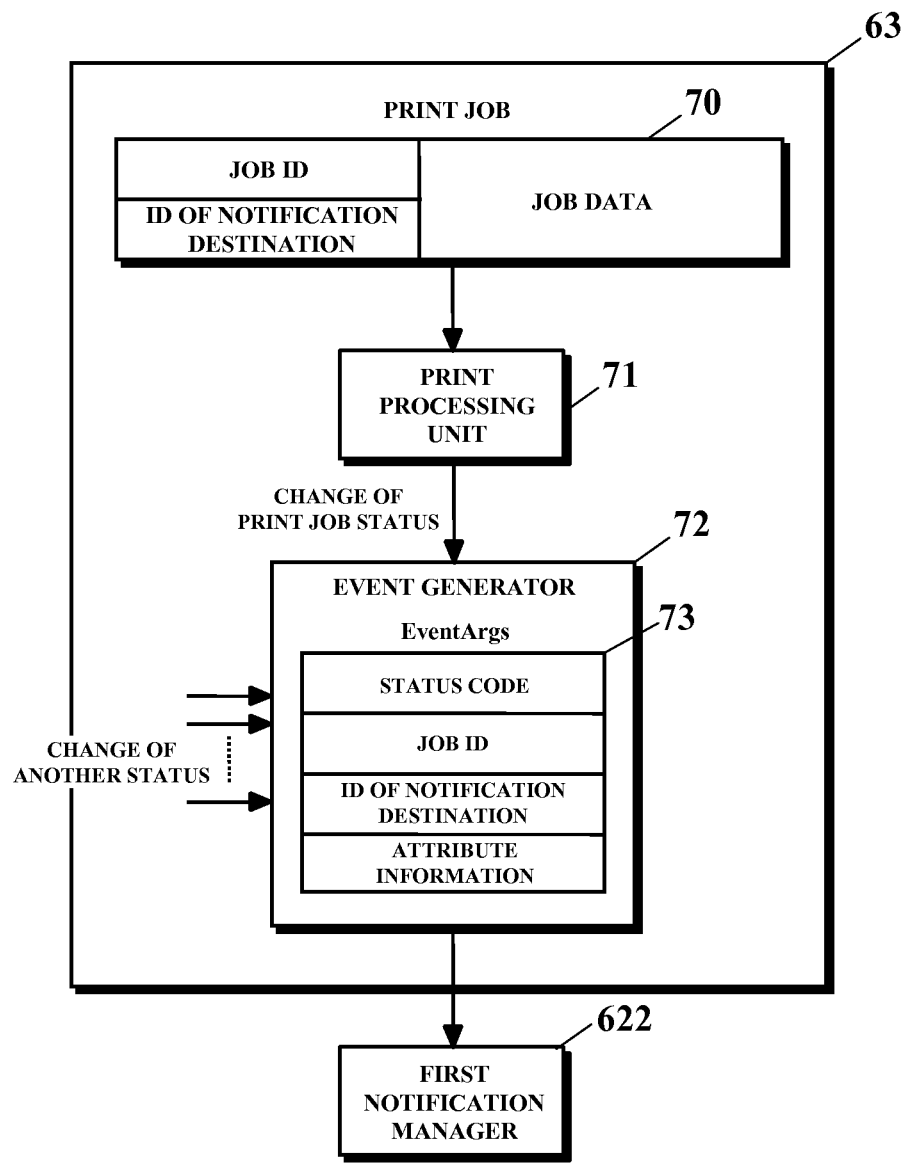
FIG. 5 is a block diagram illustrating a functional configuration of a relationship between a print job process and a first notification manager in an image forming apparatus main unit.

FIG. 5 is a block diagram illustrating a functional configuration of a relationship between a print job process in the image forming apparatus main unit 63 and the first notification manager 622.

A print job 70 received from the first HTTP/TCP/IP communication unit 60 is temporarily stored in the first DRAM 204 illustrated in FIG. 2. The print job 70 includes job data, a job ID, and an ID of a notification destination.

When the notification destination is any one of the PCs 10-1 to 10-N, the ID of the notification destination is the IP address of the one of the PCs 10-1 to 10-N, and it is added to the print job 70 by a printer driver of the one of the PCs 10-1 to 10-N. When the notification destination is the mobile terminal apparatus 32, the ID of the notification destination is a combination of the IP address of the push notification server 42 (FIG. 1) and the device token of the mobile terminal apparatus 32, and it is added to the print job 70 by a print application in the mobile terminal apparatus 32.

A print processing unit 71 calls an event generator 72 every time the print job status changes, such as when printing starts, when printing stops, when printing pauses, when printing restarts, when a printed sheet is output (when the number of printed sheets changes), and when printing is completed. In the case of a change in a print job status, the event generator 72 calls the first notification manager 622 as an event handler together with an event argument (EventArgs) 73, including a status code corresponding to the content of the change of the print job status among the status codes 0100 to 0104 illustrated in FIG. 4C, the ID of the notification destination, the job ID, and the attribute information (in the case of a change in the number of printed sheets, the value of the number of printed sheets/the total number of pages). In the case of a change in another status, that is, in a status other than the print job status, the event generator 72 calls the first notification manager 622 together with the event argument 73, including a status code corresponding to the content of the change of the other status among the status codes 0200 to 0203, 0304, and 0305 illustrated in FIG. 4C and the attribute information (e.g., a percentage of a toner remaining amount or a percentage of remaining sheets in a paper feed cassette).

Figure 6:
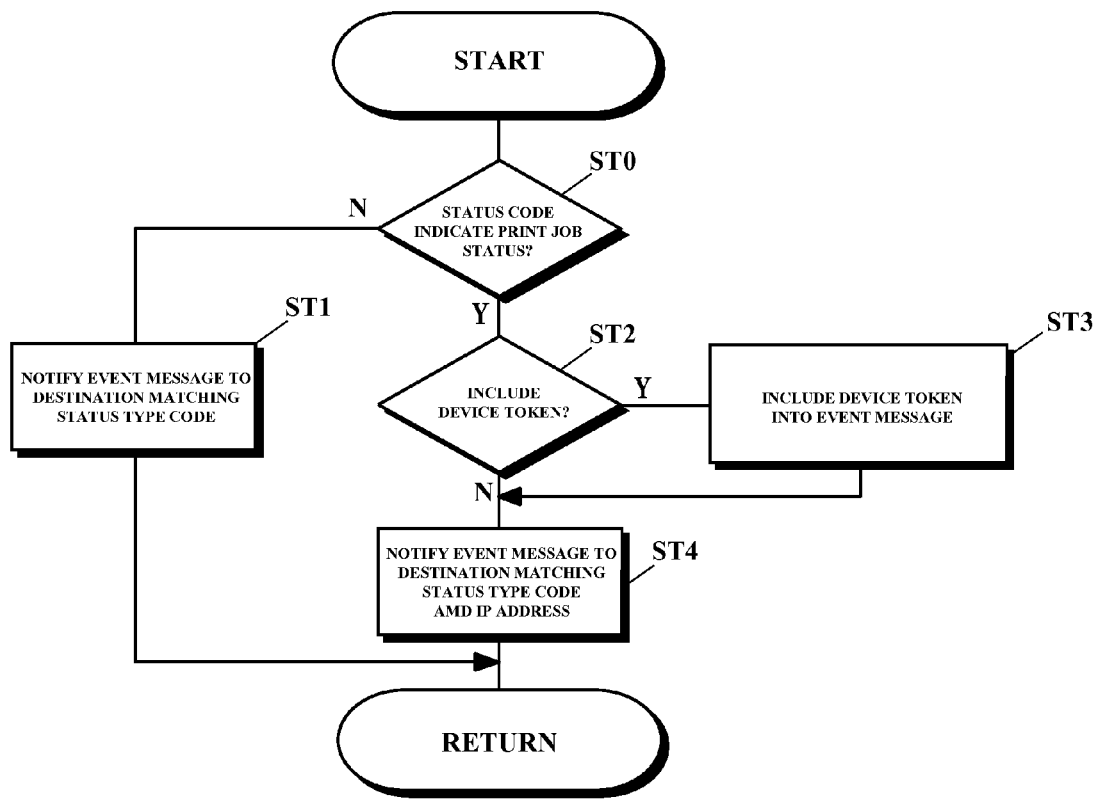
FIG. 6 is a flowchart illustrating a process in the first notification manager in the image forming apparatus.

In response to each of these calls, the first notification manager 622 starts process illustrated in FIG. 6.

FIG. 6 is a flowchart illustrating a process in the first notification manager 622 in the image forming apparatus 20.

At step ST0, if the status code in the event argument 73 indicates a status other than a print job status, that is, the status type code of the first two digits of the status code is not 01, the process proceeds to step ST1; if the status code indicates a print job status, the process proceeds to step ST2.

At step ST1, the first notification manager 622 searches the first subscription table 621 illustrated in FIG. 4A using the status type code as the key. For each hit row (the row of "all statuses" is hit without exception), if the present time is before the deadline, the first notification manager 622 notifies an event message (status code and attribute information) to its IP address as the destination. That is, the first notification manager 622 generates an XML-format SOAP message including the event message via the first SOAP processing unit 61 and transmits it to the destination via the HTTP/TCP/IP protocol stack in the first HTTP/TCP/IP communication unit 60. Then the process illustrated in FIG. 6 ends.

At step ST2, if the ID of the notification destination in the event argument 73 includes a device token, the process proceeds to step ST3; if it is not so, the process proceeds to step ST4.

At step ST3, the first notification manager 622 includes the device token into the event message.

At step ST4, the first notification manager 622 searches the first subscription table 621 illustrated in FIG. 4A using a combination of the first two digits (status type code) of the status code in the event argument 73 and the IP address included in the ID of the notification destination in the event argument 73 as the key. For each hit row (the row of "all statuses" is hit if there is a match in the IP address), if the present time is before the deadline, the first notification manager 622 notifies the event message (status code, job ID, device token, attribute information) to its IP address as the destination.

In FIG. 3, if the destination is the provider 40, the SOAP message is transmitted to the second SOAP processing unit 51 via the HTTP/TCP/IP protocol stack in the second HTTP/TCP/IP communication unit 52, it is XML-deserialized, and the event message is supplied to the event sink 53.

The event sink 53 updates the status in a status storage unit 54 in the provider 40 with the event message.

The status storage unit 54 in the provider 40 includes a job status table illustrated in FIG. 10A. If the status code included in the event message indicates a print job status, the event sink 53 updates the status code at a row where the job ID included in the event message is included in the job status table with the status code included in the event message. If the status code included in the event message is the number of printed sheets, the event sink 53 performs updating with the number of printed sheets included in the event message. If the status code included in the event message is a code other than the print job status, the event sink 53 writes the attribute information at an address corresponding to the status code in the status storage unit 54.

The event sink 53 calls a second notification manager 84 in the provider 40 using the received event message as the argument. The second notification manager 84 starts process illustrated in FIG. 7.

Figure 7:
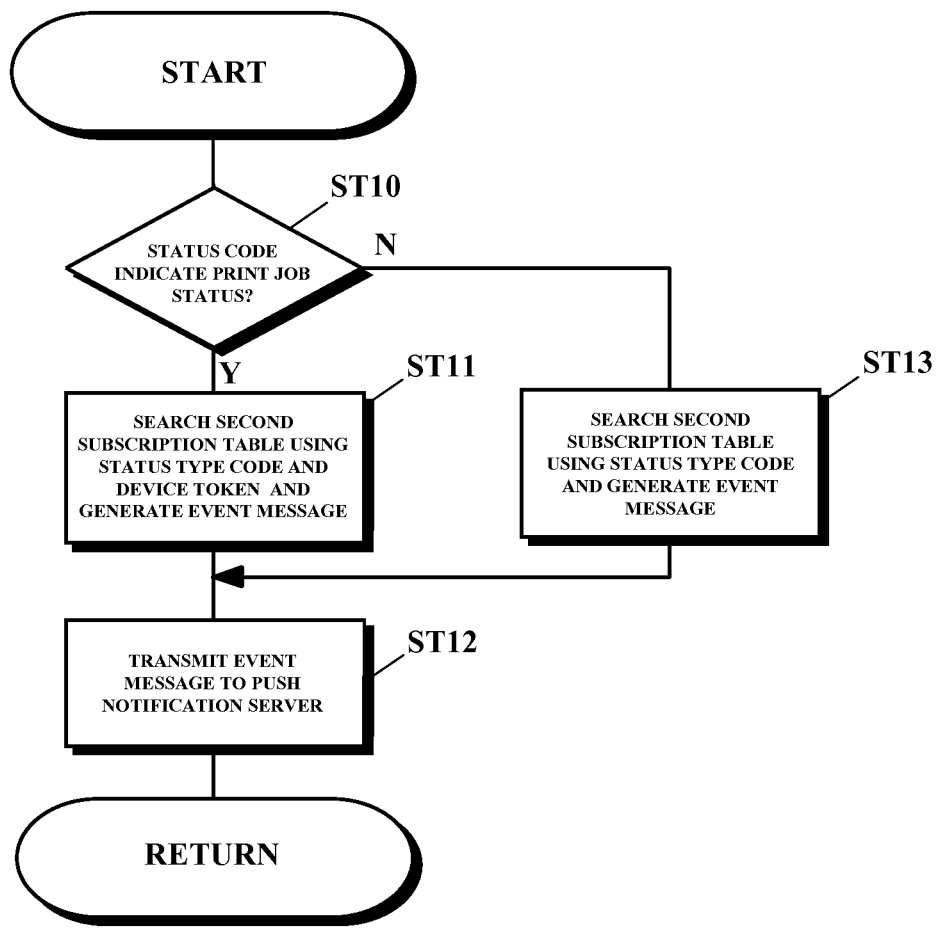
FIG. 7 is a flowchart illustrating a process in a second notification manager in the provider.

FIG. 7 is a flowchart illustrating a process in the second notification manager in the provider 40.

At step ST10, if the status type code of the first two digits of the status code in the event argument 73 indicates the print job status, that is, if the status type code of the first two digits is 01 and if the event message includes the device token, the process proceeds to step ST 11; if the status type code of the first two digits is not 01 and if the event message does not include the device token, then the process proceeds to step ST13.

At step ST11, the second notification manager 84 searches a second subscription table 83 illustrated in FIG. 8 using a combination of the status type code and the device token in the event argument 73 as the key. For each hit row, if the present time is before the deadline, the second notification manager 84 generates the event message including the device token and the status code and the attribute information in the event argument 73.

At step ST12, a JavaScript objection notation (JSON) processing unit 81 illustrated in FIG. 3 is called using the event message as the argument, the JSON processing unit 81 converts the event message into a JSON format, and it is transmitted to the push notification server 42 via an HTTP/SSL/TCP/IP protocol stack in an HTTP/SSL/TCP/IP communication unit 80.

At step ST13, the second notification manager 84 searches the second subscription table 83 using the status type code as the key. For each hit row, if the present time is before the deadline, the second notification manager 84 generates an event message including the device token and the status code and the attribute information in the event argument 73. Step ST13 proceeds to step ST12.

Figure 9:
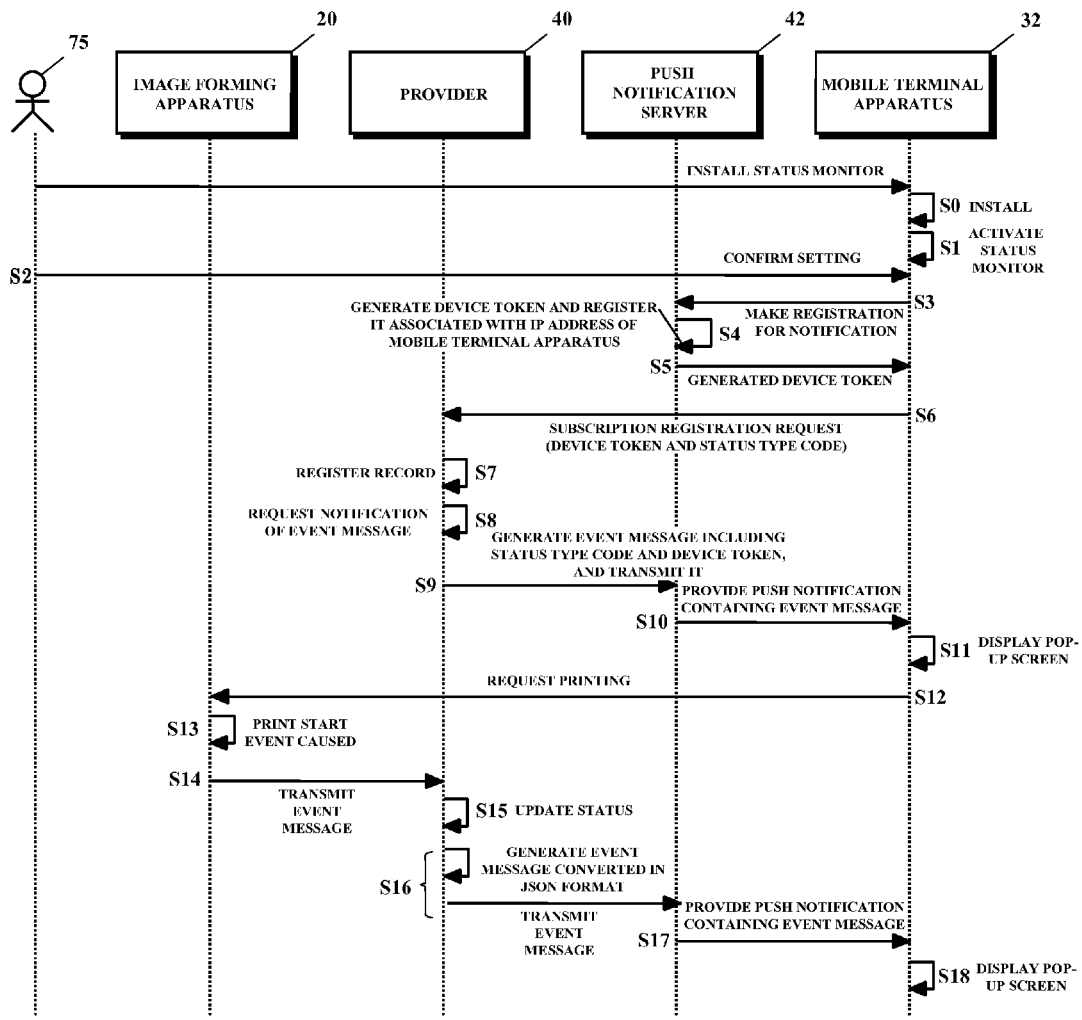
FIG. 9 is a sequence diagram illustrating an operation in the push notification system.

FIG. 9 is a sequence diagram illustrating operations of the push notification system.

At step S0, a user 75 operates the mobile terminal apparatus 32 and installs a status monitor into the mobile terminal apparatus 32.

At step S1, the user 75 touches the icon of the installed status monitor and activates it.

At step S2, the status monitor causes the user to display a settings screen, and the user selects a status type code that is a target of push notification, specifies a displaying method at the time of notification, turns on or off sounds at the time of notification, and selects other settings.

At step S3, when the settings are confirmed by an operation of the user, the status monitor requests the push notification server 42 to make registration for notification.

At step S4, the push notification server 42 generates the device token being a universally unique identifier (UUID) and registers it and the IP address of the mobile terminal apparatus 32 in association with each other.

At step S5, the push notification server 42 returns the generated device token to the mobile terminal apparatus 32.

At step S6, the status monitor transmits the device token together with the status type code in step S2 to the provider 40 and provides the provider 40 with a subscription registration request.

At step S7, the subscription registration request is notified to a second subscription manager 82 via the HTTP/SSL/TCP/IP communication unit 80 and the JSON processing unit 81 illustrated in FIG. 3. The second subscription manager 82 additionally registers a record that includes the status type code, the device token, and the deadline in which a predetermined time is added to the present time in the second subscription table 83. If there is a plurality of status type codes, their respective corresponding records are additionally registered.

At step S8, the second subscription manager 82 specifies the device token and requests the second notification manager 84 to provide notification of an event message based on the content in the status storage unit 54.

In response to the additional registration of the record by the second subscription manager 82, at step S9, the second notification manager 84 searches the second subscription table 83 using the device token as the key. For each hit row, the second notification manager 84 generates an event message including the status code having the status type code at the row in the status storage unit 54, the attribute information corresponding to the status code, and the device token. In addition, the second notification manager 84 converts the event message into a JSON format by calling the JSON processing unit 81 using the event message as the argument, and the converted event message is transmitted to the push notification server 42 via the HTTP/SSL/TCP/IP communication unit 80.

At step S10, the push notification server 42 provides a push notification containing the received event message to the mobile terminal apparatus 32 having the IP address corresponding to the device token.

At step S11, when the mobile terminal apparatus 32 receives the event message, it activates the status monitor and displays a pop-up screen based on the content of notification of the event message in accordance with the settings in step S2. The status monitor includes a status storage unit having substantially the same configuration as that of the status storage unit 54 in the provider 40 and updates the content in the status storage unit on the basis of the event message in substantially the same way as that by the event sink 53 in the provider 40.

The user 75 sees the displayed screens on the status monitor illustrated in FIGS. 11B and 11C described later corresponding to the content in the status storage unit and checks whether the image forming apparatus 20 can perform printing. At step S12, the user 75 activates a print application, selects the print job and the image forming apparatus 20 in the print application, and requests printing. The print application generates the job ID, which is a UUID, before the request of printing, and includes the job ID and the device token into the print job.

The image forming apparatus 20 spools the received print job and sequentially prints it.

At step S13, when the printing of the print job starts, a print start event is caused by the print processing unit 71 calling the event generator 72 illustrated in FIG. 5, and the first notification manager 622 is called.

At step S14, the first notification manager 622 performs a notification process. The event message is transmitted to the event sink 53 via the first SOAP processing unit 61, the first HTTP/TCP/IP communication unit 60, the second HTTP/TCP/IP communication unit 52, and the second SOAP processing unit 51 illustrated in FIG. 3.

In response to the event transmission from step S14, at step S15, the event sink 53 updates the status in the status storage unit 54 on the basis of the event message and calls the second notification manager 84 using the event message as the argument.

At step S16, the second notification manager 84 generates the event message converted in the JSON format, and transmits it to the push notification server 42.

At step S17, the push notification server 42 provides a push notification containing the event message to the mobile terminal apparatus 32, as in the case of step S10.

Figure 11A:
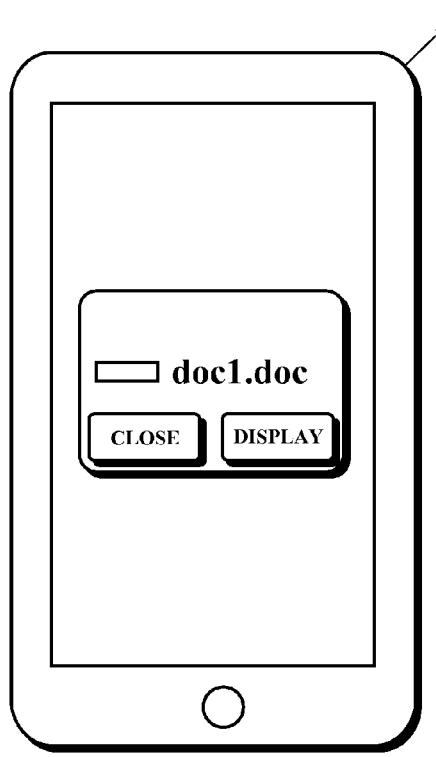
FIG. 11A is a schematic diagram illustrating an example of a pop-up screen appearing when an event message is push-notified to a mobile terminal apparatus.

At step S18, the status monitor displays a pop-up screen, such as the one illustrated in FIG. 11A. In the displaying of the pop-up screen, the job ID included in the event message is changed to the document name using a document name table (FIG. 10B) of correspondence between job IDs and document names illustrated in FIG. 11B.

Figure 11B:
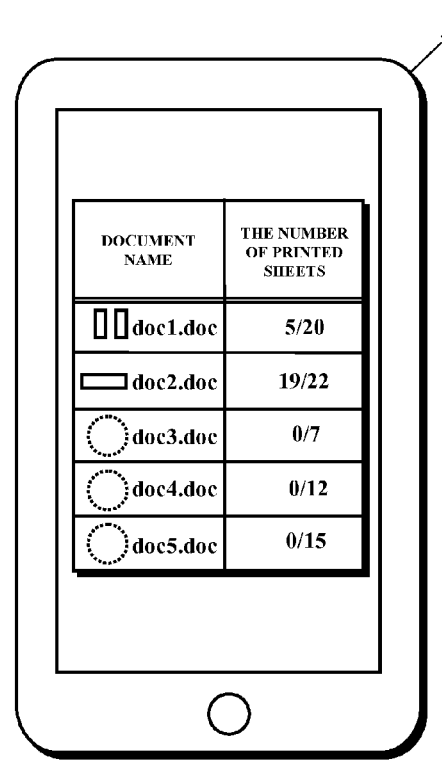
FIG. 11B is a schematic diagram illustrating an example of a pop-up screen on a status monitor appearing after the pop-up screen illustrated in FIG. 11A.

When the "display" button on the pop-up screen illustrated in FIG. 11A is touched, the details of all job statuses, as illustrated in the pop-up screen in FIG. 11B. The pop-up screen illustrated in FIG. 11B shows the job status of each print job and the number of printed sheets to the total number of sheets to be printed in the case where the mobile terminal apparatus 32 requests printing of a plurality of print jobs. The icons left to the document names doc1.doc and doc2.doc indicate that the print job status is stopping printing and during printing, respectively. The icons left to the document names doc3.doc to doc5.doc indicate that the print job status is waiting for printing.

For each print job, every time the print job status changes, an event occurs and it is provided a push notification. It is to be noted, however, that for a change in the number of printed sheets, the status monitor does not display the pop-up screen illustrated in FIG. 11A.

Figure 11C:
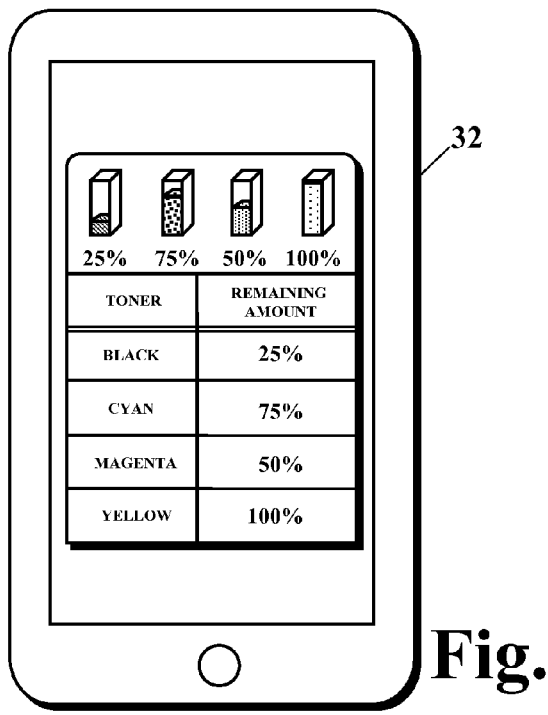
FIG. 11C is a schematic diagram illustrating another example of the pop-up screen on the status monitor appearing after the pop-up screen illustrated in FIG. 11A.

When the pop-up screen illustrated in FIG. 11B is slid to the left, the pop-up screen illustrated in FIG. 11C is displayed. This pop-up screen shows the toner remaining amounts. The remaining toner amount for each of the CMYK colors is indicated in steps of 25%. When this value changes, an event occurs.

Actions in which APNS is not directly involved, such as updating the deadlines in the first subscription table 621 and the second subscription table 83 and cancelling subscription, are carried out in accordance with the WS-Eventing specifications.

According to the present embodiment, a configuration capable of making a push notification also to the mobile terminal apparatus 32 requiring push notification specifications different from those of WS-Eventing can be achieved by a simple change in the event message. In the image forming apparatus 20, as illustrated in FIG. 6, in the case where the status type code indicates a print job status (ST0), if the print job data includes a device token (ST2), the device token is included into the event message (ST3). In response to receipt of an event message, as illustrated in FIG. 7, if the event message includes no device token, that is, if it is determined that the status code is not a job status (ST10), the provider 40 generates an event message that includes the device token of a record and the status code and the attribute information corresponding to the status code included in the event message, the record being registered in the second subscription table 83 and matching the status type code to which the status code included in the event message belongs (ST13), and then transmits the event message to the push notification server 42 (ST12). If the event message includes the device token, that is, if it is determined that the status code is a print job status (ST10) and if the record including the status type code and the device token is registered in the second subscription table 83 illustrated in FIG. 8, the provider 40 generates an event message that includes the device token and the status code and the attribute information corresponding to the status code included in the event message (ST11), and transmits the event message to the push notification server 42 (ST12). Thus the image forming apparatus 20 is merely required to transmit a single event message to the provider 40 with respect to the occurrence of a single event, and it is not necessary to transmit a plurality of event messages corresponding to a plurality of mobile terminal apparatus 32 to the provider 40. Accordingly, an increase in the amount of communication traffic can be suppressed.

While various aspects and embodiments have been disclosed herein, other aspects and embodiments are possible. Other designs may be used in which the above-described components are each present.

For example, the LAN 30 may be connected to a plurality of providers 40. In addition, a provider 40 may be shared by a plurality of LANs 30.

For example, a configuration may be used in which the components 60 to 62 illustrated in FIG. 3 are included in a print server, and an event message from an image forming apparatus 20 connected to the print server over a network is notified via a notification manager in the print server.

For example, a configuration may be used in which no deadline is included in the first subscription table 621 and/or second subscription table 83.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. A push notification system comprising:
an image forming apparatus connected to a network;
a mobile terminal apparatus connected to the network via an access point connected to the network, configured to transmit print job data to the image forming apparatus, and configured to cause the image forming apparatus to print the print job data;
a push notification server connected to the network; and
a provider connected to the network,
wherein the image forming apparatus is configured to:
generate a first event message that includes a status code, attribute information corresponding to the status code, and, if a status type code to which the status code belongs indicates a print job status, a device token of the mobile terminal apparatus included in the print job data; and
transmit the first event message to the provider,
wherein the provider is configured to,
in response to a subscription registration request including the status type code and the device token transmitted from the mobile terminal apparatus, register a record that includes the status type code and the device token in a subscription table;
if the first event message transmitted from the image forming apparatus includes no device token, generate a second event message that includes the device token in a first record and the status code and the attribute information included in the first event message, the first record being registered in the subscription table and matching the status type code to which the status code included in the first event message belongs;

if the first event message transmitted from the image forming apparatus includes the device token, generate the second event message that includes the device token in a second record and the status code and the attribute information included in the first event message, the second record being registered in the subscription table and matching the status type code to which the status code included in the first event message belongs and the device token included in the first event message; and transmit the second event message to the push notification server; and wherein the push notification server is configured to transmit the second event message to the mobile terminal apparatus corresponding to the device token included in the second event message.

2. The push notification system according to claim 1, wherein the provider is further configured to transmit the subscription registration request that includes an IP address of the provider and the status type code indicating all statuses to the image forming apparatus, in response to start-up of an operating system or an input of instruction.

3. The push notification system according to claim 1, wherein the provider is further configured to write, if the status code included in the first event message does not indicate the print job status, the attribute information at an address corresponding to the status code included in the first event message and update, if the status code indicates the print job status, the status code corresponding to a job ID included in the first event message with the status code included in the first event message.

4. The push notification system according to claim 1, wherein, if the status type code does not indicate the print job status, the status type code indicates at least one of a toner remaining amount and an amount of sheets remaining on a paper cassette tray.

5. The push notification system according to claim 1, wherein, if the status type code to which the status code belongs indicates the print job status, the status code indicates at least one of waiting for printing, during printing, stopping printing, the number of printed sheets, and completion of printing.

6. The push notification system according to claim 1, wherein, if the status type code to which the status code belongs does not indicate the print job status, the status code indicates at least one of a cyan/magenta/yellow/black toner remaining amount and an amount of sheets remaining on each paper feed cassette.

7. A push notification method for an image forming apparatus connected to a network, a mobile terminal apparatus connected to the network via an access point connected to the network, configured to transmit print job data to the image forming apparatus, and configured to cause the image forming apparatus to print the print job data, a push notification server connected to the network, and a provider connected to the network, the push notification method comprising:

via the image forming apparatus,
generating a first event message that includes a status code, attribute information corresponding to the status code, and, if a status type code to which the status code belongs indicates a print job status, a device token of the mobile terminal apparatus included in the print job data;

transmitting the first event message to the provider;

via the provider,
in response to a subscription registration request including a status type code and a device token transmitted from the mobile terminal apparatus, registering a record that includes the status type code and the device token in a subscription table;

if the first event message transmitted from the image forming apparatus includes no device token, generating a second event message that includes a device token in a record and the status code and the attribute information included in the first event message, the record being registered in the subscription table and matching the status type code to which the status code included in the first event message belongs;

if the first event message transmitted from the image forming apparatus includes the device token, generating the second event message that includes a device token in a record and the status code and the attribute information included in the first event message, the record being registered in the subscription table and matching the status type code to which the status code included in the first event message belongs and the device token included in the first event message;

transmitting the second event message to the push notification server; and via the push notification server,
transmitting the second event message to the mobile terminal apparatus corresponding to the device token included in the second event message.

8. The push notification method according to claim 7, further comprising;

via the provider,
transmitting the subscription registration request that includes an IP address of the provider and the status type code indicating all statuses to the image forming apparatus, in response to start-up of an operating system or an input of instruction.

9. The push notification method according to claim 7, further comprising:

via the provider,
writing, if the status code included in the first event message does not indicate the print job status, the attribute information at an address corresponding to the status code included in the first event message; and, updating, if the status code indicates the print job status, the status code corresponding to a job ID included in the first event message with the status code included in the first event message.

10. The push notification method according to claim 7, wherein, if the status type code does not indicate the print job status, the status type code indicates at least one of a toner remaining amount and an amount of sheets remaining on a paper cassette tray.

11. The push notification method according to claim 7, wherein, if the status type code to which the status code belongs indicates the print job status, the status code indicates at least one of waiting for printing, during printing, stopping printing, the number of printed sheets, and completion of printing.

12. The push notification system according to claim 7, wherein, if the status type code to which the status code belongs does not indicate the print job status, the status code indicates at least one of a cyan/magenta/yellow/black toner remaining amount and an amount of sheets remaining on each paper feed cassette.

13. A push notification system, comprising:

an image forming apparatus connected to a network;

a mobile terminal apparatus connected to the network via an access point connected to the network, configured to transmit print job data to the image forming apparatus, and configured to cause the image forming apparatus to print the print job data;

a push notification server connected to the network; and a provider connected to the network, wherein the provider is configured to, in response to a subscription registration request including a status type code and a device token transmitted from the mobile terminal apparatus, register a record that includes the status type code and the device token in a subscription table;

if a first event message transmitted from the image forming apparatus includes no device token, generate a second event message that includes the device token in a first record and a status code and attribute information included in the first event message, the first record being registered in the subscription table and matching the status type code to which the status code included in the first event message belongs;

if the first event message transmitted from the image forming apparatus includes the device token, generate the second event message that includes the device token in a second record and the status code and the attribute information included in the first event message, the second record being registered in the subscription table and matching the status type code to which the status code included in the first event message belongs and the device token included in the first event message; and transmit the second event message to the push notification server.

14. The push notification system according to claim 13, wherein the image forming apparatus is configured to:

generate the first event message that includes the status code, the attribute information corresponding to the status code, and, if a status type code to which the status code belongs indicates a print job status, the device token of the mobile terminal apparatus included in the print job data; and transmit the first event message to the provider.

15. The push notification system according to claim 13, wherein the push notification server is configured to transmit the second event message to the mobile terminal apparatus corresponding to the device token included in the second event message.

16. The push notification system according to claim 13, wherein the provider is further configured to transmit the subscription registration request that includes an IP address of the provider and the status type code indicating all statuses to the image forming apparatus, in response to start-up of an operating system or an input of instruction.

17. The push notification system according to claim 13, wherein the provider is further configured to write, if the status code included in the first event message does not indicate the print job status, the attribute information at an address corresponding to the status code included in the first event message and update, if the status code indicates the print job status, the status code corresponding to a job ID included in the first event message with the status code included in the first event message.

18. The push notification system according to claim 13, wherein, if the status type code does not indicate the print job status, the status type code indicates at least one of a toner remaining amount and an amount of sheets remaining on a paper cassette tray.

19. The push notification system according to claim 13, wherein, if the status type code to which the status code belongs indicates the print job status, the status code indicates at least one of waiting for printing, during printing, stopping printing, the number of printed sheets, and completion of printing.

20. The push notification system according to claim 13, wherein, if the status type code to which the status code belongs does not indicate the print job status, the status code indicates at least one of a cyan/magenta/yellow/black toner remaining amount and an amount of sheets remaining on each paper feed cassette.

\* \* \* \* \*